INVENTOR.
FRANK R. BRADLEY, JR.
BY
Dean, Fairbank & Hirsch
ATTORNEYS

INVENTOR.
FRANK R. BRADLEY, JR.
BY
Dean, Fairbank & Hirsch
ATTORNEYS

United States Patent Office 3,418,643
Patented Dec. 24, 1968

3,418,643

MEMORY DEVICE IN CONJUNCTION WITH A MAGNETICALLY VARIABLE ELECTRIC SIGNAL GENERATOR

Frank R. Bradley, Jr., 9 Dash Place, Riverdale, N.Y. 10471

Filed Apr. 9, 1964, Ser. No. 358,502
2 Claims. (Cl. 340—174)

ABSTRACT OF THE DISCLOSURE

An electrical signal generator having an output varied in response to variations in a magnetic field applied thereto, a variable magnetic field generator operatively associated with the signal generator, circuitry for deriving a difference signal by opposing the output of the signal generator and the input signal, a storage device for receiving and storing the difference signal, an intermittently energized pulse generator amplifier for receiving the signal of said storage device and intermittently applying pulses to said magnetic field generator when in the energized condition, and a driver unit for disconnecting said difference signal from said storage means when said amplifier pulse generator is energized.

Figure 1:
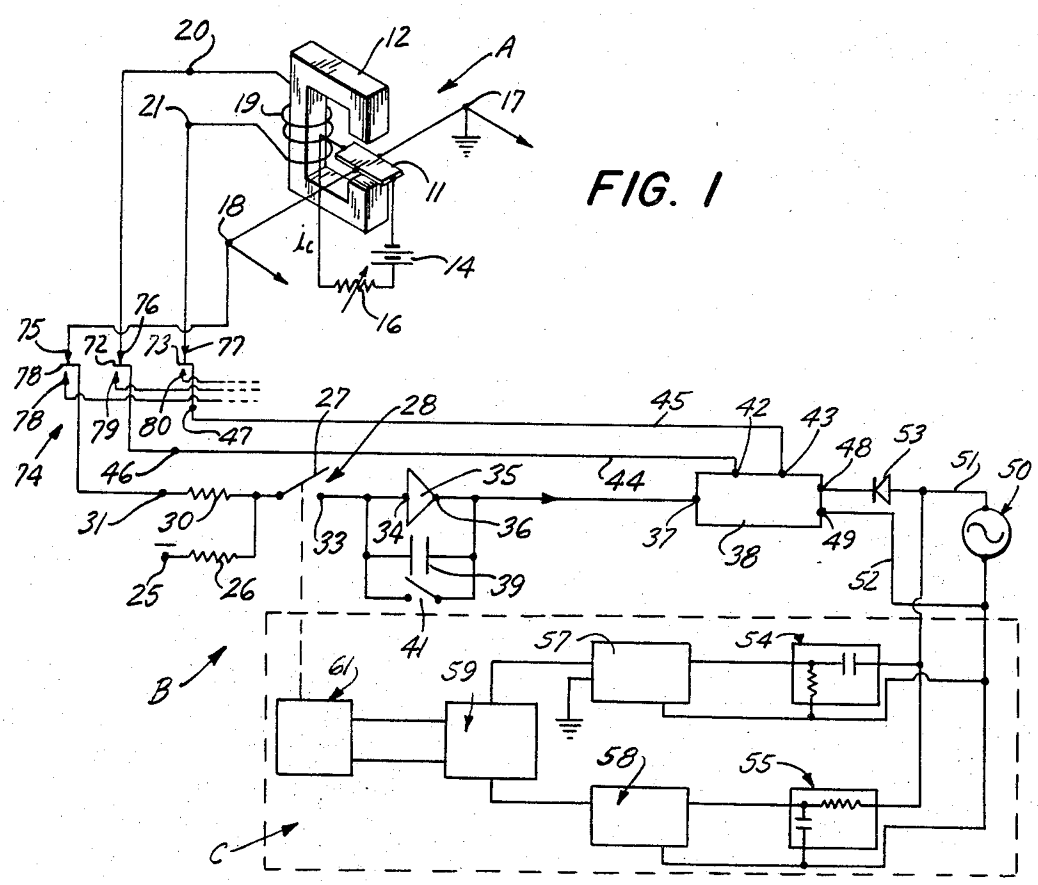

This invention relates to the art of memory devices, more particularly of the type employing a magnetically variable electrical signal generator.

As conductive to an understanding of the invention, it is noted that certain electrical signal generators have properties such that with changes in a magnetic field associated therewith, the output signal will change accordingly.

Thus, for example, certain materials such as indium antimonide provide an electrical potential, known as a "Hall Voltage" between laterally spaced points along one axis of a strip of such material when a control current is flowing longitudinally of the material when the plane of the strip is perpendicular to a magnetic field. The electrical property of these materials has become known as the "Hall Effect" and devices which use material having this property are customarily called "Hall Effect Devices."

The output voltage produced by a conventional Hall Effect Device or Hall Generator is generally proportional to the product of the magnetic field strength and the intensity of the current passed through a Hall Effect element called the "Hall Plate." The term "Hall Plate" is used in the specification and claims to define a thin metal plate of substantial "Hall effect coefficient," having a pair of spaced input electrodes connected to supply current through the plate between the input electrodes and havng a pair of output electrodes connected to the plate on opposite sides of the input current path.

The absolute magnitude of this Hall effect output voltage for a given magnitude field and a given input Hall current is dependent upon the composition and dimensions of the Hall plate. The output voltage in such conventional device varies with variations in either the magnetic field which is called the control field, or the input Hall plate current which is called the control current.

Another example of such electrical signal generator is the magnetically variable resistor also made of indium antimonide, for example, whose resistance may be varied by changing the associated magnetic field.

As shown in copending application Ser. No. 199,463, filed June 1, 1962, now Patent No. 3,131,381, an electrical signal generator such as a Hall Plate is used as a memory device to remember a given input signal, said electrical signal generator having a permanent magnet associated therewith and a coil through which a current flows that is generated by the difference between the signal to be remembered and the output of the electrical signal generator associated with the magnet.

The flux or magnetism of the permanent magnet will change due to the current through the coil and consequently the electrical signal generator output will change until it is equal to the value of the signal to be remembered at which time since the signals through the coil are equal and in opposition there will be no more current flow through the coil. Thus, the permanent magnet will have a set flux or magnetism so that if the signal to be remembered is then removed, the signal from the electrical signal generator will be equal to the signal to be remembered.

This device is useful therefore in many applications such as to store information in computors until the information is requred for various mathematical computations.

Since, during the setting operation of the magnet, the latter has a given flux level due to prior energization and is also excited electromagnetically by the current through the coil, the difference signal does not accurately reflect any given state of magnetism of the permanent magnet. Hence, the electrical signal generator output signal, in the absence of coil current, is not accurately related to the value of the signal to be remembered.

It is accordingly among the objects of the invention to provide a memory device that utilizes a magnetically variable electrical signal generator and which will have high sensitivity and rapid setting speed and which in the absence of coil current will provide an output signal that is accurately related to the value of the signal to be remembered.

According to the invention, these objects are accomplished by providing successive measuring and magnetizing or setting intervals. During the measuring interval, no current is applied to the coil and the difference between the electrical signal generator output and the value of the signal to be remembered is electrically stored. During the next successive setting or magnetizing interval, current is applied to the coil of value in accordance with the difference signal stored and this current changes the magnetization level of the permanent magnet in direction to reduce the difference signal. This cycle is repeated until the output of the electrical signal generator is substantially equal to the value of the signal to be remembered or in the case of a time varying signal to be remembered, until such instant as it is desired to memorise the signal to be remembered.

Figure 2:
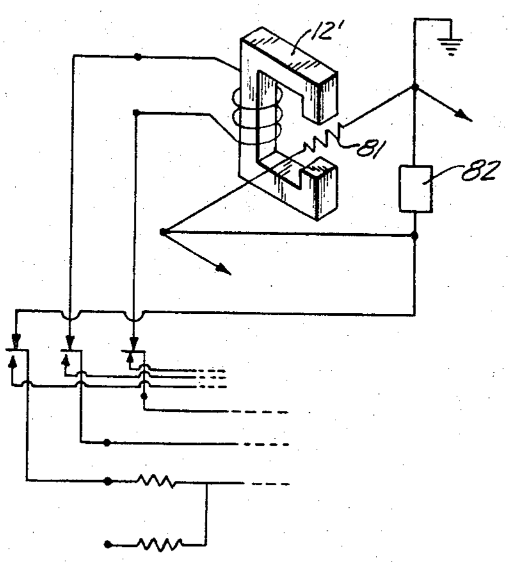
Figures 3, 4:
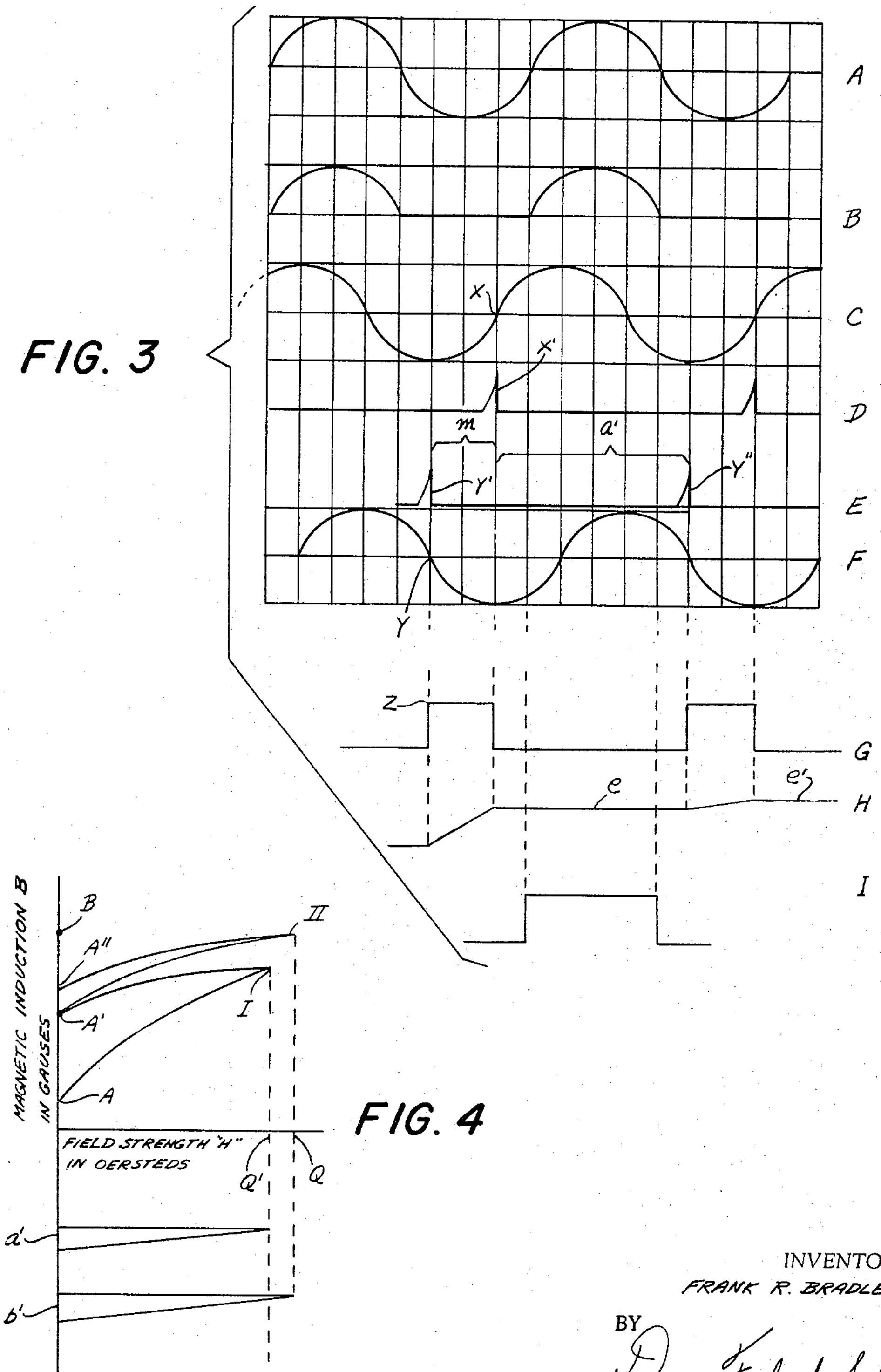

In the accompanying drawings in which are shown one or more of various possible embodiments of the several features of the invention, FIG. 1 is a diagrammatic view of a memory unit according to one embodiment of the invention utilizing a "Hall Plate" as the electrical signal generator, FIG. 2 is a diagrammatic view of a memory unit according to another embodiment of the invention utilizing a magnetically variable resistor as the electrical signal generator, FIG. 3 is a collection of curves illustrating the operation of the unit shown in FIGS. 1 and 2, and FIG. 4 is a graph illustrating the magnetism of the permanent magnet.

Referring now to the drawings, in the illustrative embodiment shown in FIG. 1, the memory unit comprises a storage unit A in which the electrical signal generator is a Hall Plate 11 having a permanent magnet 12 associated therewith. Means are provided for sending a control current $i_c$ longitudinally through said Hall Plate 11. The control current means may, for example, comprise a source of DC voltage 14 and a variable resistor 16 for adjusting the magnitude of the control current.

One of the longitudinal side electrodes of the Hall Plate is connected to a terminal 17 which is connected to ground and the other side electrode of the Hall Plate is connected to terminal 18. A coil 19 is wound around a leg of the magnet 12 and terminals 20, 21 are connected to the respective ends of the coil 19.

The memory unit also includes a control unit B having an input terminal 25 to which the signal to be remembered is connected. Terminal 25 is connected to one end of a resistor 26, the other end of which is connected to the contact arm 27 of a switch 28 and to one end of a resistor 30, the other end of which is connected to terminal 31.

The resistor 30 is of high ohmic value as compared to the resistance of the Hall Plate 11 and the resistor 26 illustratively is the same value as resistor 30.

The fixed contact 33 of switch 28 is connected to the input terminal 34 of operational amplifier 35, the output terminal 36 of which is connected to the input terminal 37 of power amplifier 38.

Amplifier 35 has an associated integrating capacitor 39 and a switch 41 is connected in parallel with said capacitor. The output terminals 42, 43 of the power amplifier 38 are connected by leads 44, 45 to terminals 46, 47. The power amplifier 38 has terminals 48, 49 to which a source of alternating potential 50 is connected by leads 51, 52, the lead 51 having a diode 53 in series therewith which permits passage to the power amplifier of the positive cycle of the alternating current source.

The control unit B includes a timing circuit C which is connected to the AC source 50. The timing circuit C includes a conventional lead network 54 and a lag network 55. The outputs of the networks 54, 55 are connected respectively to the inputs of conventional Schmitt trigger circuits 57, 58, the former sensing positive going zero crossings and the latter negative going zero crossings.

The Schmitt trigger circuits 57, 58 provide pulse outputs to a conventional bi-stable multi-vibrator 59 and the output of multi-vibrator 59 is fed to a driver unit 61 which may comprise an amplifier driving a relay coil, the switch 28 comprising the contacts of the relay. This driver unit in conventional manner will control the contact arm 27 of switch 28 to open and close the switch depending upon whether trigger circuit 57 or 58 is actuated.

The terminals 31, 46, 47 are connected to contact arms 71, 72, 73 of a switch 74 normally engaging contacts 75, 76, 77 which are connected to terminals 18, 20 and 21 respectively. The fixed contacts 78, 79, 80 of the switch are connected to the contacts 18, 20, 21 of another storage unit A.

In the operation of the equipment the signal to be remembered is applied to terminal 25. Since at the same time, due to the current through the Hall Plate 11 from source 14, there will be a Hall output voltage between terminals 17, 18, there will be a current through resistor 30 which will be in opposition to the current through resistor 26 produced by the input signal thereby providing a resultant difference current.

As previously set forth, the AC source is applied to the lead and lag networks 54, 55 and the lead network Schmitt trigger unit 57 senses positive going zero crossings as shown in FIG. 3C at X and provides a positive pulse at such time as shown in FIG. 3D at X'. The lag network Schmitt trigger 58 senses negative going zero crossings as shown in FIG. 3F at Y and provides a positive pulse at such time as shown in FIG. 3E at Y'.

The lag network Schmitt trigger 58 sets the bistable multi-vibrator 59 to actuate the driver 61 to close switch 28 as shown in FIG. 3G at Z.

As a result, when switch 28 is closed, the difference between the two currents will be applied to the input terminal 34 of operational amplifier 35 to provide a charging current to the integrating capacitor 39 proportional to such difference. The output of amplifier 35 which is fed to power amplifier 38 is of value substantially proportional to the charge on capacitor 39.

As the power amplifier 38 due to the diode 53 will only be energized each half cycle of the AC cycle as shown in FIG. 3B, hence an output pulse proportional to the charge on capacitor 39 will appear at the terminals 42, 43 of amplifier 28 only during such half cycle. These pulses will be applied through lines 44, 45 and closed contacts 72, 76 and 73, 77 to terminals 20, 21 and to the coil 19 of magnet 12.

Referring to FIG. 4, which shows a typical hysterisis curve, assuming the magnet 12 has been magnetized to point A due to previous setting and that the capacitor 39 has zero charge due to resetting by momentary closing of switch 41, during the measuring interval M, as a result of the magnetic induction level A, the Hall Plate 11 will generate a certain output voltage. Assuming that the voltage to be remembered is such that a magnetic induction level of B is required for the Hall Voltage to be equal to the voltage to be remembered, a net current will flow into the capacitor 39 during the measuring interval (Y' X' shown in FIGS. 3D, 3E) causing the capacitor to charge to a voltage *e* shown in FIG. 3H. During the magnetizing or setting interval *a'* (X' Y'' FIGS. 3D, 3E), a pulse of current proportional to the charge on the capacitor 39 will generate a magnetic field of Q oersteds causing the magnet to follow path A–I–A'. Thus, the magnetic field strength of the magnet will move from A to A'. In the next measuring interval there is still a difference current which is less than before and which is fed to the capacitor 39 which charges further, but at a reduced rate to a higher voltage *e'* (FIG. 3H). During the next setting interval *b'* a larger pulse of current proportional to the new charge on the capacitor generates a field of Q' oersteds causing the magnet to follow the path A'–II–A''. Thus, the magnetic field strength of the magnet will move from A' to A''.

This is repeated until the difference current is substantially zero at which time the magnetic field strength of the magnet will be at B as desired and the output voltage of the Hall Plate 11 will be substantially equal to the voltage to be remembered.

Thereupon switch 74 can be actuated to connect contact arms 71, 72, 73 to another memory unit and the output voltage from Hall Plate 11 can be read across terminals 17, 18. If desired, with the switch connected as shown, the output voltage can be read during the measuring interval.

It is to be noted that when the difference current is negligible, there will be no incremental increase of the charge on capacitor 39 and hence no increase in the magnetic induction or field strength of the magnet.

After the above cycle has been completed, the capacitor 39 may be discharged ready for the next memory setting by momentarily closing switch 41 to discharge the capacitor. This, however, is not necessary unless very fast operation is desired for the equipment will inherently discharge the capacitor and build up a charge in the opposite direction if the second remembered voltage is less than the first.

Thus, for example, as the difference current charging the capacitor 39 is now of opposite polarity (i.e., the Hall Plate voltage due to the magnetic field of magnet 12 is greater than the new voltage to be remembered) it will gradually discharge the capacitor during each measuring cycle until the voltage on the capacitor passes through zero and builds up in the opposite direction. This will cause the magnet to be driven in the opposite direction so that its field strength will be reduced with the result that the Hall output volage will drop until it is equal to the voltage to be remembered.

In the embodiment shown in FIG. 2, parts corresponding to those in FIG. 1 have the same reference numerals primed. In this embodiment, the Hall Plate 11 is replaced by a magnetically variable resistor 81 supplied with a constant current by means of a conventional constant current power supply 82. The output voltage is developed as an IR drop across resistor 81 based on the resistance value of resistor 81 determined by the field strength of magnet 12'. The operation of the embodiment shown in FIG. 2 is identical to that of the embodiment of FIG. 1 and hence will not be repeated.

With the equipment above described, since the difference current is measured and fed to capacitor 39 only during the interval when no magnetizing pulses are applied to coil 19, it is apparent that the charge on capacitor 39 will be exactly proportional to such difference.

As a result, when the difference current is negligible, the magnetic field will be such that the output voltage will be substantially equal to the value of the signal to be remembered.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device for remembering an input signal, comprising an electrical signal generator whose output varies with variations in the magnetic field applied thereto, a permanent magnet associated with said electrical signal generator, a coil associated with said permanent magnet, means to oppose the output from said electrical signal generator and said input signal to determine a difference signal, means fed by said difference signal electrically to store the latter, a pulse generator fed by said storage means to provide a signal determined by said stored signal and connected to said coil, said pulse generator comprising an amplifier, means intermittently to energize said amplifier, whereby the pulse generator signal will be applied to said coil only when said amplifier is energized, means alternately to connect said difference signal to said storage means and to cut off application of said pulse generator signal to said coil and to cut off application of said difference signal to said storage means and effect application of said pulse generator signal to said coil, and the means connecting said difference signal to said storage means being actuated between successive energizations of said amplifier.

2. A device for remembering an input signal, comprising an electrical signal generator whose output varies with variations in the magnetic field applied thereto, a permanent magnet associated with said electrical signal generator, a coil associated with said permanent magnet, means to oppose the output from said electrical signal generator and said input signal to determine a difference signal, means fed by said difference signal electrically to store the latter, said storage means comprising an amplifier having an integrating capacitor associated therewith, a switch interposed in circuit between said means to determine a difference signal and said storage means, a pulse generator fed by said storage means to provide a signal determined by said stored signal and connected to said coil, said pulse generator comprising an amplifier, means alternately to energize said pulse generator amplifier and to actuate said switch, whereby the magnetic field will be set and the difference signal determined alternately.

References Cited

UNITED STATES PATENTS

| | | | |
|---|---|---|---|
| 3,131,381 | 4/1964 | Bradley | 340—174 |
| 2,712,601 | 7/1955 | Reinwald | 179—100.2 |

BERNARD KONICK, *Primary Examiner.*

P. SPERBER, *Assistant Examiner.*

U.S. Cl. X.R.

317—235